United States Patent [19]

Kennedy et al.

[11] Patent Number: 4,695,881
[45] Date of Patent: Sep. 22, 1987

[54] APPARATUS FOR IMAGING INFRARED EMITTING SURFACES

[76] Inventors: Jesse R. Kennedy, 5217 S. Marietta Dr.; Marcus R. Kennedy, Rte. 3, Box 94, both of Mobile, Ala. 36618

[21] Appl. No.: 809,329

[22] Filed: Dec. 16, 1985

[51] Int. Cl.⁴ .............................................. H04N 7/18
[52] U.S. Cl. .................................... 358/100; 358/229; 358/113
[58] Field of Search ............. 358/100, 101, 113, 229, 358/228; 374/124, 127, 130; 376/248, 249, 256; 250/339

[56] References Cited

U.S. PATENT DOCUMENTS

| | | | |
|---|---|---|---|
| 3,021,386 | 2/1962 | Clark | 358/100 |
| 3,609,236 | 9/1971 | Heilman | 358/100 |
| 4,016,597 | 4/1977 | Dillon et al. | 358/228 X |
| 4,131,914 | 12/1978 | Bricmont | 358/100 |
| 4,246,604 | 1/1981 | Hundertmark | 358/229 X |
| 4,255,762 | 3/1981 | Takeyasu et al. | 358/210 X |
| 4,539,588 | 9/1985 | Ariessohn et al. | 358/100 X |

Primary Examiner—James J. Groody
Assistant Examiner—Victor R. Kostak
Attorney, Agent, or Firm—Richard C. Litman

[57] ABSTRACT

Infrared emitting surfaces such as a smelt bed in a Kraft-chemical recovery boiler can be monitored by a closed circuit infrared camera equipped with a 1.5 micrometer edge filter. The camera power supply is isolated from the heat sensitive camera pick up tube and yoke assembly. This separation also makes it easier to mount and dismount the tube on and off of the boiler. The tube is contained in a housing which is supported by bearings which are slidable on rods attached to the boiler wall. This attachment ensures that the image produced will not change with mounting and dismounting the camera. An image change would result in a waste of smelt bed chemicals.

9 Claims, 5 Drawing Figures

APPARATUS FOR IMAGING INFRARED EMITTING SURFACES

FIELD OF THE INVENTION

This invention relates to a closed circuit television system that is capable of producing a clear television picture of the inside of a chemical recovery boiler, a power boiler or a kiln used in the manufacture of lime or cement. This invention also relates to a means of mounting the television components for such a system.

BACKGROUND OF THE INVENTION

Most pulp and paper mills have chemical recovery boilers. The chemical recovery boiler is basically a steam generating power boiler that uses black liquor as its primary fuel. The two main objectives of the chemical recovery boiler are to recover the chemicals used in the cooking of wood and to use the thermal energy from combustion of the organics. The black liquor contains materials dissolved from the wood and spent chemicals from the digesting process. This liquor is washed from the pulp and concentrated in the evaporating plant before being sent to the recovery boiler. The recovery boiler converts the combustible materials from the wood into steam energy, converts sulfur compounds to sodium sulfide and converts sodium organic compounds to sodium carbonate. The chemicals are then discharged from the furnace bottom as molten smelt through smelt spouts for further processing.

Inside the recovery boiler, a molten bed of solids is present at the bottom of the boiler. The liquor is sprayed into the boiler approximately 20 to 35 feet above the bed level, depending upon the size and type of boiler at a height of. When the liquor is fired into the boiler, part of the liquor sticks to the walls and hardens while the rest either burns in suspension or falls to the bottom. The need arises for the boiler operator to be aware of the configuration and the height of the smelt bed for both economic and safety reasons.

It is also important for an operator to know what is happening in lime kilns, power boilers and cement kilns. Much of the discussion applicable to chemical recovery boilers is also applicable to kilns and power boilers.

The thermal system in a Kraft chemical recovery boiler is far more complicated than that found in other combustion systems, including kilns and power boilers. A Kraft recovery boiler acts simultaneously as a fuel dryer, a furnace and a chemical reactor. In Kraft recovery boilers, in addition to normal fossil fuel combustion products, there are also substantial amounts of hydrogen, hydrogen sulfide, sulfur dioxide, atomic and molecular sodium vapor, sodium hydroxide, methyl mercaptan, dimethyl sulfide and many other species. Reducing conditions prevail adjacent the smelt bed and these give way to oxidizing conditions higher in the boiler. In addition, there are substantial quantities of particulates suspended in the gases. These particles are predominantly molten droplets of sodium carbonate and sodium sulfate as well as unburned liquor droplets and burning char particles. It is important that an equilibrium, both physical and chemical, be maintained in the boiler to maximize chemical recovery.

Various techniques have been used to monitor boilers. U.S. Pat. No. 3,021,386 discloses a boiler port viewing system employing a TV camera having a vidicon pick up tube. Hamamatsu advertising literature dated Jan. 10, 1981, teaches using a TV camera equipped with an infrared vidicon tube in combination with a bandpass filter, and also discloses that an infrared TV camera can be used for temperature monitoring of smelting furnaces. U.S. Pat. No. 4,539,588 teaches using an infrared TV camera in combination with a bandpass filter for viewing a smelt bed in a Kraft recovery boiler.

Summary of the Invention

While the prior art has been somewhat effective for its intended purpose it is submitted that the teaching of the prior art has failed to recognize, much less solve, many of the problems which exist in relation to monitoring a smelt bed in a Kraft chemical recovery boiler and to a lesser extent in kilns and power boilers. The prior art at best teaches a method of monitoring a smelt bed in a Kraft recovery boiler in the northwestern United States during optimum boiler conditions if the camera is positoned properly, not moved and no replacements or adjustments are made to it. The prior art teaches the use of an optical filter limiting the spectral sensitivity to wave lengths longer than 1 micrometer and rejecting wavelengths strongly radiated by or absorbed by the gaseous species overlying the surface to be imaged. Since commercial infrared vidicon tubes are only sensitive up to wavelengths slightly over 2 micrometers, this leaves only a band filter centered at 1.68 micrometers between two infrared absorbing water vapor bands as suitable for imaging a Kraft recovery smelt bed, as water vapor and particles are the only materials (as disclosed by the prior art in U.S. Pat. No. 4,539,588) which would strongly interfere with infrared radiation between 1 and 2 micrometers in wavelength during normal operation of a smelt bed using a specific feed of black liquor. It is important to note that during abnormal conditions it is necessary to see a broader radiation band, as the 1.68 micrometer band is obscured.

The present invention is based upon the discovery that an edge filter with a cut on, a term defined below, at above 1.5 micrometers can be employed to view the surface of a smelt bed during both normal and abnormal operations of a Kraft chemical recovery boiler. The image produced is as good as the image produced using a narrow band filter, and a broader band of radiation can be observed. Edge filters having a cut on above 0.7 and 1.3 micrometers are also useful filters in an infrared TV camera for viewing such diverse operations as smelt beds, kilns and power boilers. By "cut on" is meant that the filter allows the passage of light longer than the recited wavelength while blocking the passage of light having a shorter wavelength.

To be more specific, the apparatus of the present invention has an image detection means sensitive in the infrared region for sensing an image of the emitting surfaces, lens means for projecting and focusing the infrared image of the surfaces onto the detection means, optical edge filter means limiting the shorter wave length spectral sensitivity of the imaging apparatus, and display means responsive to the detection means for producing a visual image of the surfaces being observed.

The term infrared is not meant totally to exclude visible light as is apparent from the wave length recitations above.

For a smelt bed it is preferred that the edge filter limit the spectral sensitivity of the imaging apparatus to wavelengths longer than 1.5 micrometers, and that the imaging apparatus have a sensitivity cut off at above 2.0 micrometers.

While designed primarily to view the surface of smelt beds, the imaging apparatus of the present invention can also be used to view hot lime in a lime kiln, hot cement in a cement kiln and boiler surfaces in a power boiler.

For smaller boilers an extended range red ultricon tube with a near infrared edge filter limiting light passed to light having a wavelength longer than 0.7 micrometers can be used.

The pictures produced using the above described variations of the imaging device of the present invention can all be fine tuned using neutral density filters.

In order to prevent the imaging apparatus from being adversely effected by the heat generated by the power supply of the imaging apparatus, it is preferred that the imaging apparatus have heat generating electrical circuits thermally isolated from heat sensitive components of the imaging apparatus. This can be accomplished by an insulating partition inside the camera housing separating the power supply from the rest of the camera, by physically separating the power supply from the rest of the camera, or most preferably by only mounting the infrared pick up tube and yoke assembly on the boiler with the remaining camera electronics and power supply in a separate control box along with the power supply including the power transformer.

To further stabilize the electronic components, all junctions which do not generate heat are encapsulated in silicone to prevent physical movement of components.

As will be discussed later with respect to the camera mount, the physical separation of the imaging apparatus from the control box containing the electronics and power supply aids in the stabilization of the image generated by the infrared camera and results in enhanced control of the smelt bed.

Also necessary to the stabilization of the image is the elimination of a spacer between the lens and the camera. The focal length of the lens is modified so that no spacer is required, which eliminates the likelihood of the system getting out of focus due to movement of the spacer during rough treatment in a mill environment.

The apparatus of the present invention has a mounting for a television camera and extension lens assembly especially adapted for televising the interior of an apertured hazardous chamber. The first element of the mounting is a tubular member fixed in position relative to a wall of said chamber and aligned with an aperture through the wall. The tubular member can be integral with a wall well, welded into the boiler wall or integral with a bracket welded to the boiler wall. The important thing is that the tubular member have a fixed positon with respect to the boiler wall. A plurality of guide rods are integral with and have axes parallel to the tubular member. The camera housing is mounted on and supported by elongated bearings. The bearings are slidably mounted on the guide rods by elongated openings in the bearings which are concentric with the guide rods.

When the walls of a boiler are to be cleaned of slag, the camera housing is retracted on the guide rods and the elongated lens assembly is retracted into the tubular member. In the usual configuration the tubular member extends to the edge of the boiler wall. The camera lens assembly will be protected by the tubular assembly from the cleaning device, slag, and other material cleaned from the walls. After cleaning, the television housing is slid forward on the supporting bearings riding on the rods until the assembly reaches a fixed stop which reproducibly limits the forward movement of said bearings on said guide rods. By means of the stop and the guide rods, the camera is repositioned exactly as it was before retraction. This is important, particularly in Kraft chemical recovery boilers because the operator controls the smelt bed level based upon the view which he receives from a television monitor. As a general statement of averages, a one fourth inch change in vertical camera position can reflect an erroneous one foot change in smelt bed level to an operator, based upon the image he receives from the television monitor. If the operator wrongly perceives the smelt bed to be one foot too high, the operator will direct an air flow against the bed, burning and blowing off a one foot thickness of smelt bed chemicals. The operator will then operate the bed at an inefficient lower level. If the operator wrongly perceives the bed to be too low due to misalignment of the camera, the operator will inject black liquor onto the bed, raising it to a level too high to provide the optimum chemical reactions.

In order to expedite and facilitate changing or working on the lens and the picture tube, and infrared television camera tube and yoke assembly is contained in the camera housing and a second housing contains the remaining components necessary to operate the camera. The two housings are joined by an electrical cable. This eliminates electronic circuitry from getting in the way when a pick up tube needs to be changed or adjusted. It also eliminates the heat generated by the power supply and electronics package from the camera housing. The infrared detection system is very sensitive and adversely effected by heat. Another way of reducing the heat inflicted upon the infrared detection system is to place the infrared camera tube and yoke assembly along with the electronics required to operate the camera in the camera housing and to provide a separate housing for the power transformer. Another advantage of separating the infrared television pick up tube from the electronics is that the controls for the camera can be positioned remotely from the camera in an air conditioned control booth.

DETAILED DESCRIPTION

Figures 1, 2:
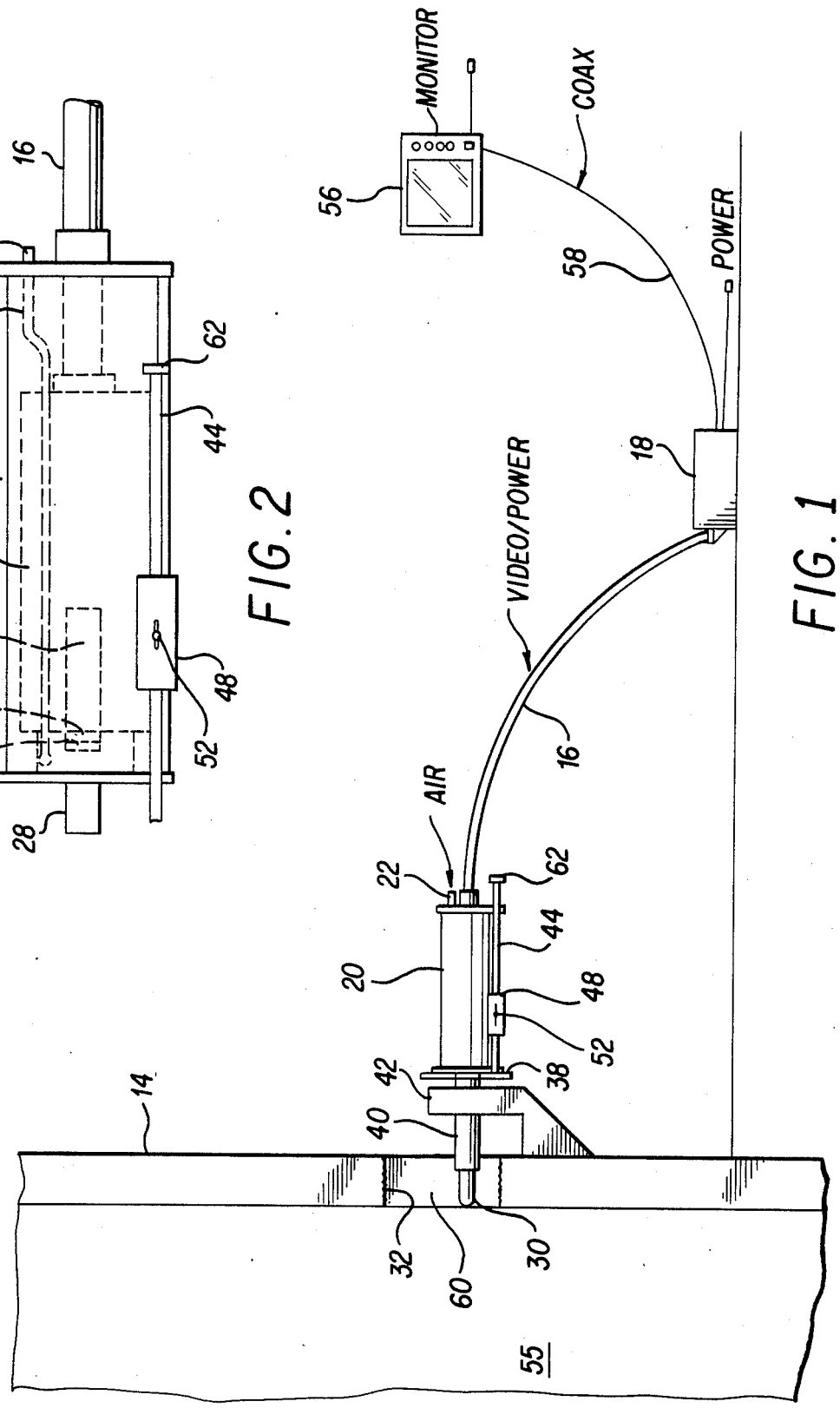
FIG. 1 is a schematic of the imaging apparatus of the invention shown attached to a wall of an enclosure to be viewed.
FIG. 2 is a cross sectional view of the camera housing of FIG. 1 showing internal components.

In FIGS. 1 and 2, the apparatus is depicted schematically. A one inch format closed circuit television camera head and yoke assembly 10, which includes an infrared vidicon or an extended range ultricon tube 12 is located adjacent boiler or kiln 14 the interior of which is to be imaged. Video and power cable 16 connects camera head and yoke assembly 10 to camera power supply and controller 18. The two piece type television camera is commercially available from Syn Fab, Edo Western, RCA, and a number of other commercial camera suppliers. The particular camera used is a 1100 line camera. Tube 12 is extremely heat sensitive, hence requiring the separation of tube 12 from heat generating electrical components for optimum performance.

Camera head and yoke assembly 10 is housed in protective enclosure 20 to protect it from ambient heat near the boiler or kiln 14. Enclosure 20 is made from one half inch thick nylon, but any other material having good high temperature resistance and low heat conductivity properties could be used. By separating the heat generating power supply and controller 18 from pick up tube 12, only a small amount of cooling air is required to cool pick up tube 12 because pick up tube 12 is no longer heated by the power supply. The cooling air enters at air connection 22 and passes through air line 24 to inside of housing 20 which surrounds the camera head and yoke assembly 10, and channels the air to lens 28.

Camera head and yoke assembly 10 is fitted with a furnace lens 28 of sufficient length to place the nodal tip 30 of lens 28 at the center line of boiler tubes 32 of boiler 14. Furnace lens 28 should be the air cooled type and 10 to 20 psig of air should be applied to cool lens 28 and to keep the nodal tip 30 of lens 28 clean.

A 1.5 micrometer edge filter 34 along with a 0.7 neutral density optical filter 36 are placed in the lens. The focal length of the lens is modified to allow proper focusing without the use of a spacer.

Figure 5:
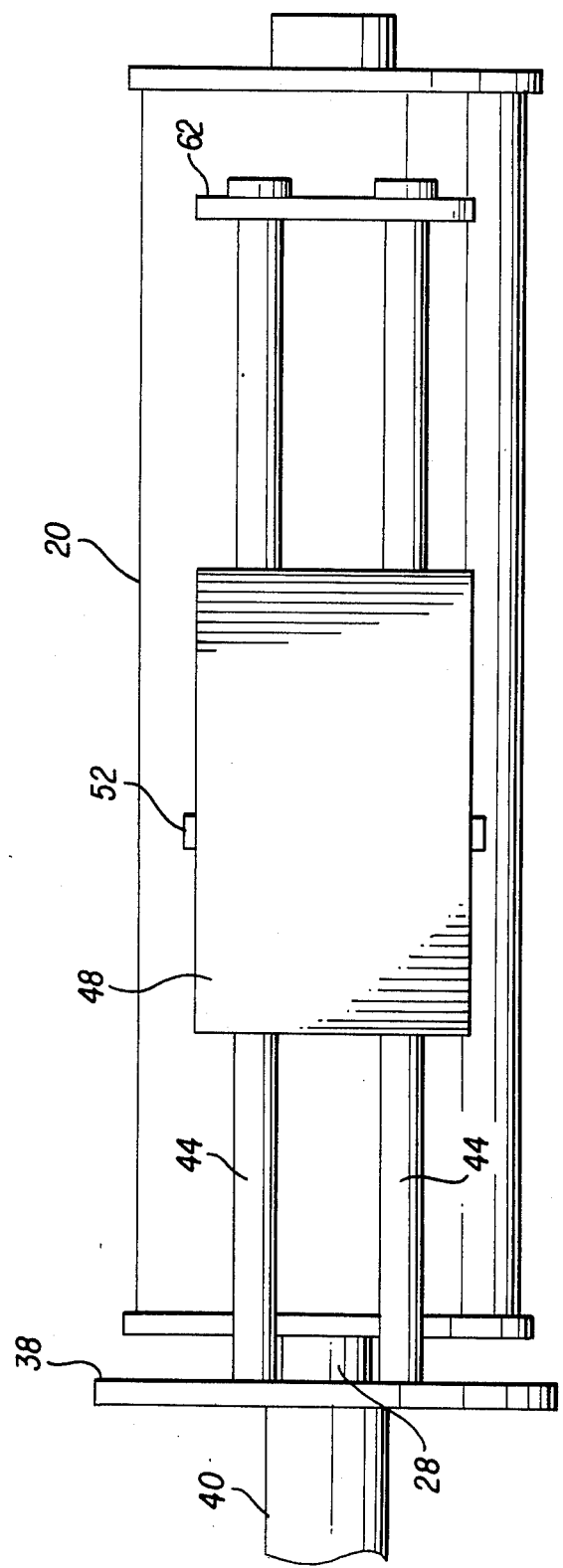
FIG. 5 shows a bottom view of the mounting of the camera housing on the guide rods.

The mounting of the camera is shown in FIGS. 1 and 5. Flange 38 is welded onto the wall of boiler or kiln 14 using bracket 42 and is integral with cylindrical lense protector tube 40. Flanged mounting device is also made integral with cylindrical tube 40. Guide rods 44 are integral with the flange of mounting device 42 and extend rearward away from and parallel with cylindrical tube 40. Camera housing 20 is supported by sliding nylon bearing 48 on guide rods 44. The forward movement of camera housing 20 is limited by housing 20 coming into contact with flange 38. Set screws 52 hold bearings 48 in place when smelt bed or kiln interior 55 of boiler 14 is to be viewed on monitor 56. Monitor 56 is attached to camera controller 18 by coaxial cable 58.

Figure 3:
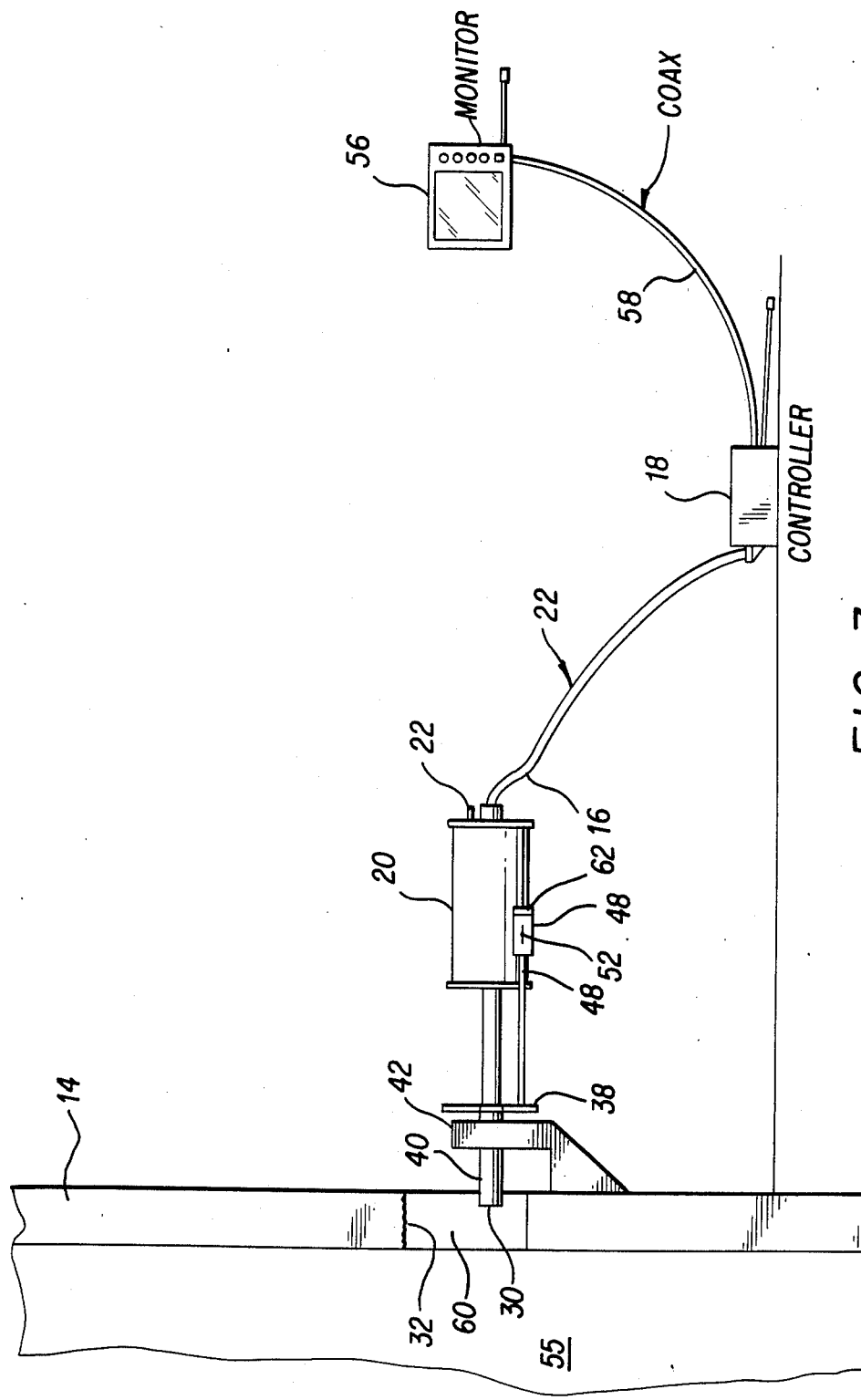
FIG. 3 shows the camera of FIG. 1 in retracted positon for deslagging.

The rods 44 in combination with bearings 48 form a slide track device which is used to slide housing 20 away from boiler 14 during deslagging operations, particularly around port hole 60. As is shown in FIG. 3, rearward movement of housing 20 also causes the nodal tip 30 of lens 28 to be drawn into the protective confines of cylindrical tube 40. The rearward movement of bearings 48 is limited by stop 62.

Figure 4:
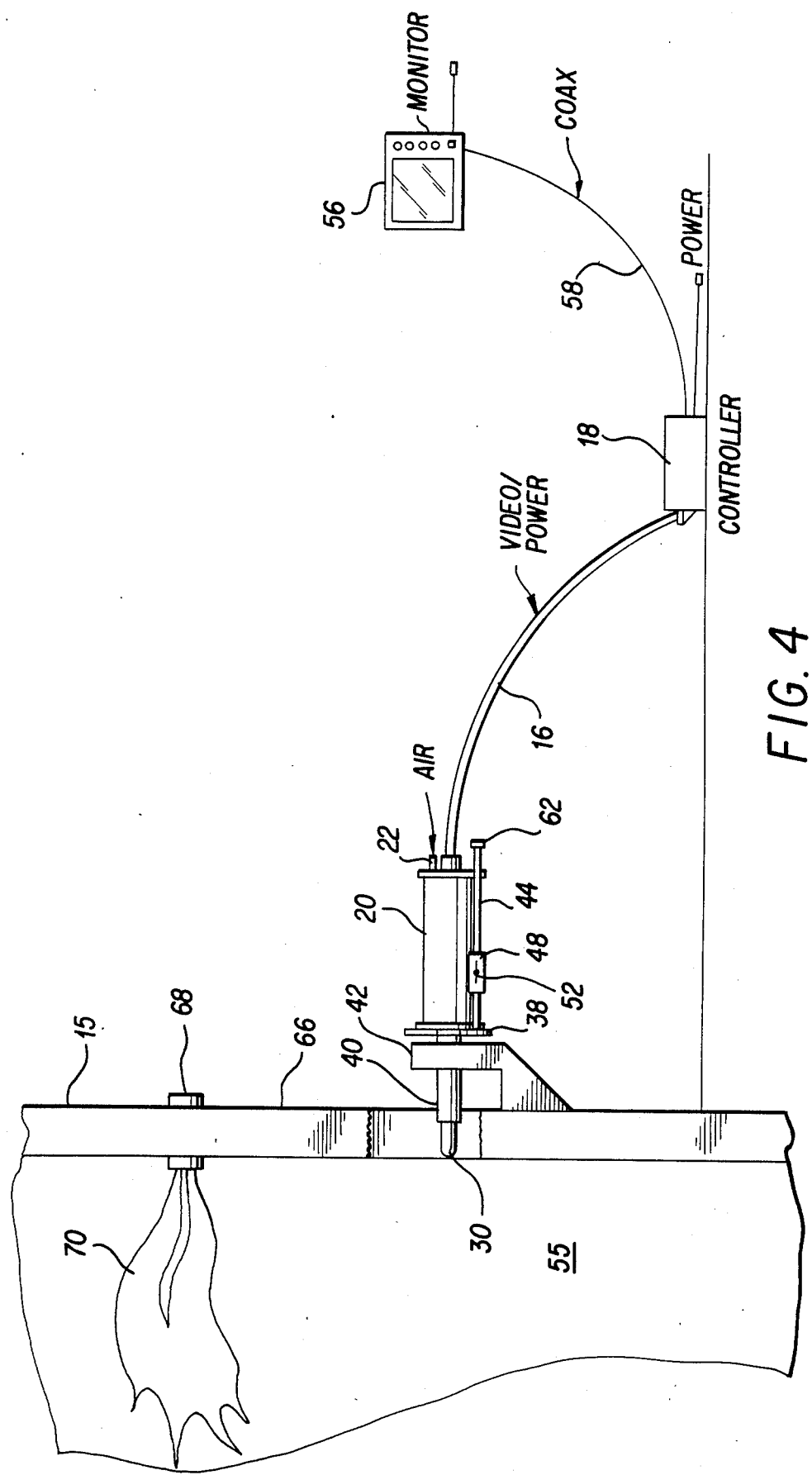
FIG. 4 shows the camera of FIG. 1 mounted on a lime kiln.

As is shown in FIG. 4 the same type of mounting used to view a smelt bed is employed to view the interior of lime kiln 15. Camera housing 20 is mounted on kiln frame 66 behind burner 68 and flame 70.

It is understood that obvious variations can be made to the present invention without departing from the spirit and scope of the following claims.

We claim:

1. An imaging apparatus comprising
    a television camera assembly and extension lens assembly for televising an interior of an apertured chamber;
    a tubular member mounted in a wall of the chamber and aligned with the aperture;
    a plurality of guide rods constructed integral with and having axes disposed parallel to the tubular member;
    bearings attached to a camera housing in the television camera assembly;
    the bearings having openings concentric with and slidably mounted on the guide rods;
    a fixed stop which limits the forward movement of the bearings on the guide rods;
    an image detection means cooperating with the television camera assembly sensitive in the infrared region for sensing an infrared image of emitting surfaces within the apertured chamber;
    lens means for projecting and focusing the infrared image of the emitting surfaces on the image detection means;
    optical filter means placed in cooperation with the lens means limiting the spectral sensitivity of the imaging apparatus including an edge filter limiting the spectral sensitivity of the imaging apparatus to wavelengths upward of 0.7 micrometers;
    display means responsive to the image detection means for producing a visual image of the emitting surfaces being observed;
    the optical filter means further including a neutral density optical filter for improving the clarity of an image produced and for prolonging life of the image detection means, and
    controls for the television camera assembly being positioned remotely from the television camera assembly.

2. The improvement of claim 1 further characterized by the infrared emitting surfaces being surfaces of a smelt bed of a Kraft pulping chemical recovery boiler.

3. The apparatus of claim 1 further characterized by
    the television camera assembly and a yoke assembly being contained in the camera housing,
    a second housing containing remaining components necessary to operate the television camera assembly, and
    an electrical cable joining circuit components within the two housings.

4. The apparatus of claim 1 wherein the improvement further comprises
    the television camera assembly and a yoke assembly along with electronics equipment required to operate the television camera assembly in the camera housing and
    a separate housing for a power transformer.

5. The improvement of claim 1 further characterized by the infrared emitting surfaces being surfaces of hot lime in a lime kiln.

6. The improvement of claim 1 further characterized by the optical filter means being an edge filter limiting the spectral sensitivity of the imaging apparatus to wavelengths longer than 1.3 micrometers.

7. The improvement of claim 6 further characterized by the imaging apparatus having a power supply thermally isolated from the imaging apparatus.

8. The improvement of claim 1 further characterized by the optical filter means being an edge filter limiting the spectral sensitivity of the imaging apparatus to wavelengths longer than 1.5 micrometers.

9. The improvement of claim 8 further characterized by the imaging apparatus having a power supply thermally isolated from heat sensitive components of the imaging apparatus.

* * * * *